US011836140B2

(12) United States Patent
Hu et al.

(10) Patent No.: US 11,836,140 B2
(45) Date of Patent: Dec. 5, 2023

(54) LOG SAMPLING AND STORAGE SYSTEM

(71) Applicant: SAP SE, Walldorf (DE)

(72) Inventors: Dongqing Hu, Shanghai (CN); Xia Yu, Shanghai (CN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/323,386

(22) Filed: May 18, 2021

(65) Prior Publication Data

US 2022/0374439 A1 Nov. 24, 2022

(51) Int. Cl.
*G06F 16/2457* (2019.01)
(52) U.S. Cl.
CPC .............................. *G06F 16/24578* (2019.01)
(58) Field of Classification Search
CPC .. G06F 11/1448; G06F 11/1451; G06F 11/14; G06F 16/24578; G06F 16/174; G06F 16/1744; G06F 16/1748; G06F 16/1734; G06F 16/1752; G06F 16/1756; G06F 3/0641; G06F 11/3476
See application file for complete search history.

(56) References Cited

U.S. PATENT DOCUMENTS

| 2017/0220610 A1* | 8/2017 | Laethem | G06F 11/3466 |
| 2018/0046529 A1* | 2/2018 | Togawa | G06F 11/0787 |
| 2018/0357214 A1* | 12/2018 | Ajiro | G06K 9/00523 |

* cited by examiner

*Primary Examiner* — Hau H Hoang
(74) *Attorney, Agent, or Firm* — Fountainhead Law Group P.C.

(57) ABSTRACT

A log sampling and storage system reduces volumes of stored log information. A log storage engine receives a series of log messages responsive to a request. The engine compares that series to various patterns previously generated from historical log data. This comparison can reference •a name of the request; •a total time to process the request; •an item count; •a message length; and/or •a message hash code. Comparing incoming log series with the predefined patterns, results in generation of a similarity score. If the score falls outside a tolerance, the existence of an outlier log message series is indicated, and that outlier log message series is stored in its entirety. However, if the similarity score falls within a tolerance, similarity to an existing predefined pattern is indicated. Rather than storing the (non-outlier) log message series, the engine directs storing a link to a sample log message series reflecting the pattern.

20 Claims, 5 Drawing Sheets

FIG. 3 cost=382ms, name="/login"

1. cost=300ms, tag=info, message="setup execution environment"
2. cost=50ms tag=info, message="find user by username"
3. cost=20ms, tag=info, message="verify password: success"
4. cost=2ms, tag=info, message="generate response"
5. cost=10ms, tag=info, message="teardown execution environment"

FIG. 4 cost=376ms, name="/login"

1. cost=290ms, tag=info, message="setup execution environment"
2. cost=53ms tag=info, message="find user by username"
3. cost=22ms, tag=info, message="verify password: success"
4. cost=3ms, tag=info, message="generate response"
5. cost=8ms, tag=info, message="teardown execution environment"

FIG. 5 cost=390ms, name="/login"

1. cost=289ms, tag=info, message="setup execution environment"
2. cost=50ms tag=info, message="find user by username"
3. cost=31ms, tag=error, message="verify password: failure"  500
4. cost=15ms, tag=info, message="generate response"
5. cost=5ms, tag=info, message="teardown execution environment"

FIG. 6 cost=421ms, name="/login"
 600
1. cost=290ms, tag=info, message="setup execution environment"
2. cost=98ms tag=info, message="find user by username"
3. cost=22ms, tag=info, message="verify password: success"
4. cost=3ms, tag=info, message="generate response"
5. cost=8ms, tag=info, message="teardown execution environment"

LOG SAMPLING AND STORAGE SYSTEM

BACKGROUND

Unless otherwise indicated herein, the approaches described in this section are not prior art to the claims in this application and are not admitted to be prior art by inclusion in this section.

With recent advances in the development of the internet and cloud technologies, computer systems are increasingly being moved to cloud environments. Implementation in a cloud environment introduces complexity, for example by substantially increasing the number of interactions between the frontend and backend, and also reducing the predictability of such frontend-backend interactions.

As a result of cloud deployment, the volume of backend log messages may increase significantly. This in turn can consume hardware resources in order to store those backend logs, effectively elevating operational cost. Moreover, if any issue arises calling for search to identify relevant saved logs, this diagnostic process can be undesirably prolonged by the sheer volume of existing saved backend logs.

SUMMARY

Embodiments provide a log storage system that effectively reduces a volume of log information stored in a cloud system. A log storage engine receives a series of log messages responsive to a request. The log storage engine compares that log message series to various patterns of log series messages previously generated from historical log data. This comparison can reference one or more features, including but not limited to: •a name of the request; •a total time to process the request; •an item count; •a message length; and •a message hash code.

Comparison of incoming log series with the predefined patterns, results in the generation of a similarity score. If the similarity score falls outside of a tolerance, the existence of an outlier log message series is indicated, and that outlier log message series is stored in its entirety.

However, if the similarity score falls within a tolerance, similarity to an existing predefined pattern is indicated. Rather than storing the incoming (non-outlier) log message series in its entirety, the log storage engine instead stores a link to a sample log message series corresponding to the matched pattern.

In this manner, a volume of stored log messages corresponding to matched patterns is substantially reduced, thereby freeing up hardware resources to store other data. Reduction of stored log message information according to embodiments, also serves to streamline the searching of a corpus of log data (e.g., for diagnostic purposes).

The following detailed description and accompanying drawings provide a better understanding of the nature and advantages of various embodiments.

BRIEF DESCRIPTION OF THE DRAWINGS

FIG. 3 shows a simplified example of a non-outlier log series.

FIG. 4 shows a simplified example of another non-outlier log series.

FIG. 5 shows a simplified example of an outlier log series.

FIG. 6 shows a simplified example of another outlier log series.

DETAILED DESCRIPTION

Described herein are methods and apparatuses that implement log sampling and storage. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
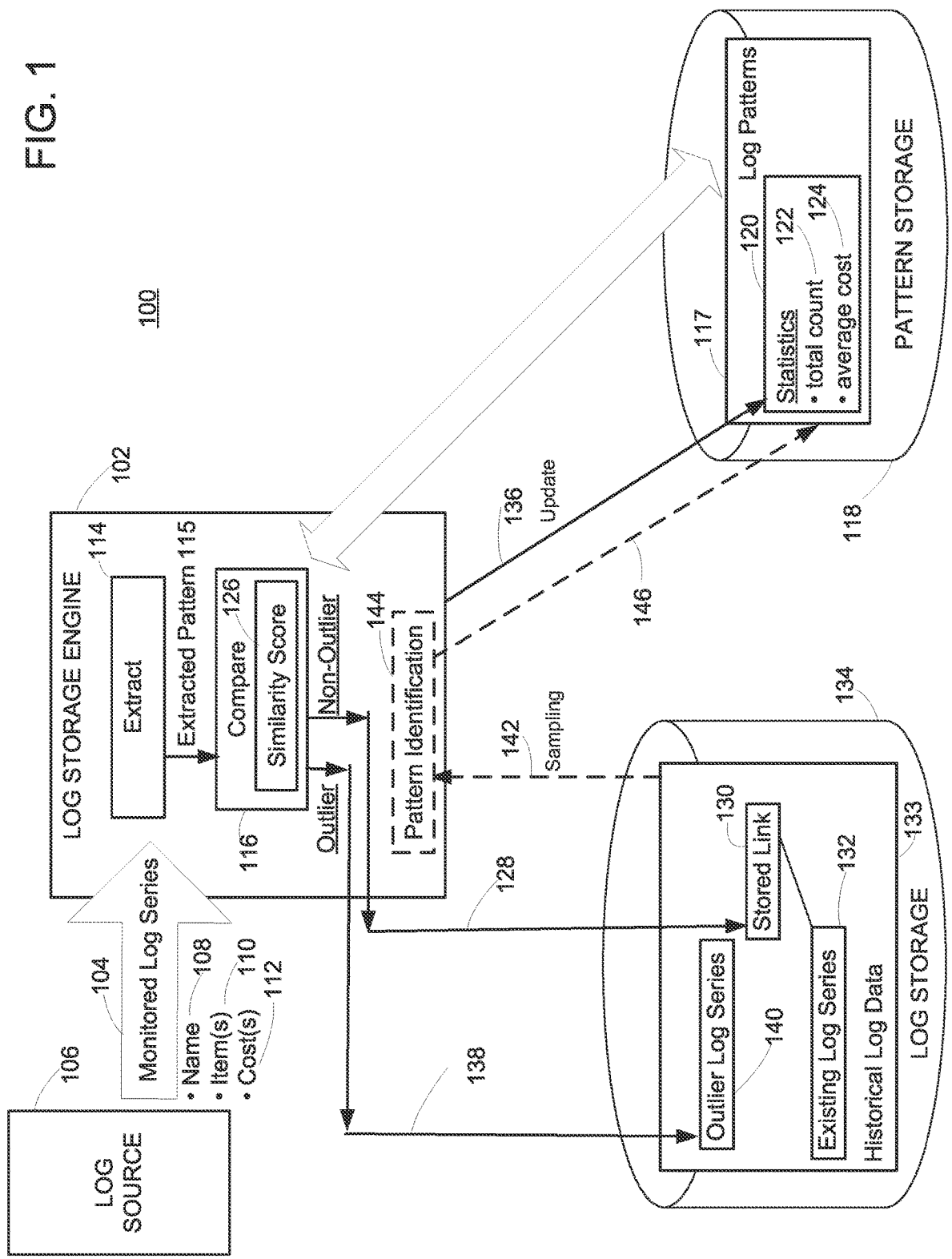
FIG. 1 shows a simplified diagram of a system according to an embodiment.

FIG. 1 shows a simplified view of an example system that is configured to implement log sampling and storage according to an embodiment. Specifically, system 100 comprises a log storage engine 102 that is configured to receive an incoming series 104 of log messages from source 106, such as the logging capability of a cloud system.

That incoming log series may be in response to a request made to the log system.

The log series may be characterized by one or more properties including:
a name 108;
item(s) 110; and
cost(s) 112.

The log storage engine then extracts 114 a pattern 115 the incoming log series that is being currently monitored. This extracting involves parsing the log series to identify its individual elements. Such elements can comprise the original request to the cloud system, a number of distinct items (e.g., log messages), a per-item cost (e.g., in processing time), a total cost, and/or others.

Then, the extracted pattern of the monitored log series, is compared 116 with existing log patterns 117 stored within non-transitory computer readable storage medium 118. The process of creating the existing log patterns is described later below.

Also stored in the non-transitory computer readable storage medium, are statistics 120 associated with each existing pattern. These statistics can include a total count 122 of matches with the existing pattern (e.g., reflecting the frequency of occurrence of that pattern).

The statistics can also include a cost 124 of the existing pattern. This cost can represent an ongoing average of the cost of all incoming log series previously matched with the particular existing pattern.

Based upon comparison of the extracted pattern with the stored patterns, a similarity score 126 is calculated. If this similarity score falls within a threshold, the incoming log series is considered to match a stored pattern, and hence is deemed a non-outlier 128.

Such a non-outlier log series is not considered informative to potential issues arising within the cloud system. Rather than storing this entire non-outlier log series, instead a simple link 130 to an existing sample log series 132 of historical log data 133, is created.

This historical log data is stored within non-transitory compute readable log storage medium 134. By storing the link rather than the entire incoming non-outlier series, log storage resources are conserved.

Also, the log storage engine updates 136 the statistics for the stored log patterns. This updating may involve revising the total count of the matched log pattern, and re-calculating an average cost of the matched log pattern.

In contrast with the above, comparison of the incoming log series may result in a similarity score falling outside the threshold. Under such circumstances, the incoming log series is considered unusual and hence is deemed an outlier 138.

Such an outlier log series is considered to be particularly informative to issues within the cloud system. Hence, the outlier log series 140 is stored in its entirety within the log storage. Details of this outlier log series are then fully available to future cloud system diagnostic efforts.

Creation of the log series patterns, is now described. In particular, the historical log series data is subjected to a sampling process 142. The sampled log data serves as input to a pattern identification procedure 144.

This pattern identification procedure identifies common features within the historical log data. Based upon these common features, groups of log series data are recognized and stored 146 as log patterns. Statistics relevant to those log patterns, are also stored.

While FIG. 1 shows the log storage engine as performing the pattern identification procedure, this is not required. According to other embodiments, log patterns could be recognized and stored by a different component. For this reason, the process of generating the log patterns is shown in dashed lines in FIG. 1. In some embodiments, log patterns could be recognized by an engine of an in-memory database, and then stored in the in-memory database.

Figure 2:
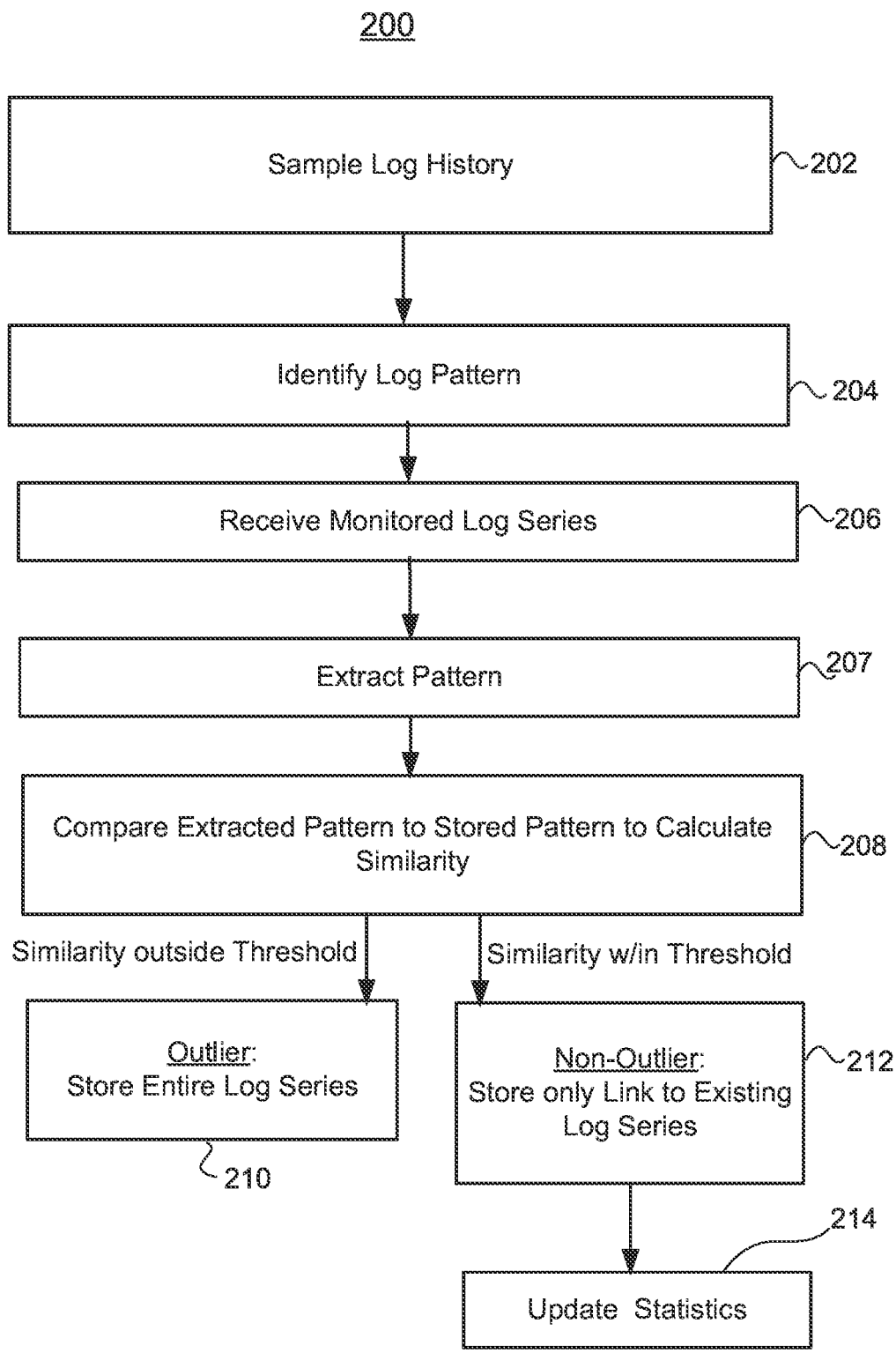
FIG. 2 shows a simplified flow diagram of a method according to an embodiment.

FIG. 2 is a flow diagram of a method 200 according to an embodiment. At 202, a stored history of log series data is sampled. At 204, the sampled log series data is processed to identify log series patterns.

At 206, an incoming monitored log series is received. At 207, a pattern is extracted from the monitored log series.

At 208, the extracted pattern is compared with the log series patterns to generate a similarity score. If the resulting similarity score is outside a threshold, the log series is deemed an outlier and at 210 the entire monitored log series is stored. That log series is thus now available for analysis to diagnose and correct potential problems. For example, the outlier log series may reveal a newly-arisen issue not reflective of existing patterns, and is hence fully available for investigation into solving that newly-arisen issue.

If the resulting similarity score is within the threshold, the log series is deemed a non-outlier. In order to conserve log storage resources, at 212 only a link to an existing log series is stored. At 214, statistics of a matched log series pattern are updated. The updated statistics accurately reflect the frequency of occurrence of recognized log series patterns. This renders the system poised to receive new incoming log series data, and to efficiently store that additional log information in a manner conserving available memory resources.

Systems and methods for implementing a log sampling and storage system according to embodiments, may offer one or more benefits. Specifically, the total size of the stored logs may be reduced, resulting in conservation of hardware space and cost savings.

Embodiments may also facilitate processing of stored log information for analysis. In particular, sampled data for each request are readily indexed, and search time will be faster.

It is further noted that embodiments may desirably impart configurability to a log storage system. For example, a system according to an embodiment may be configured to sample both successful requests and failed requests, or to only sample successful requests.

Embodiments also allow for a reproducible determination of a degree of similarity for comparison of log series. This imparts consistency and endows the user with the ability to adjust the similarity determination based upon individual experience and discretion.

Further details regarding implementation of log sampling and storage according to various embodiments, are now provided in connection with the following example.

EXAMPLE

In cloud systems, many requests are ordinary and exhibit a structure similar to one another. One example of a request is a request to log into a system.

FIG. 3 shows a simplified example of one typical log series resulting from a request to log in by a user. The name of the log in request is "/login". This results in a series of five messages that would each normally be stored in the log.

FIG. 4 shows a simplified example of another typical log series resulting from another request to log in by a user. Again, the request results in five messages for storage in the log. It is noted that the total time (376 milliseconds) of this log series, is comparable (e.g., differs by only 1.5%) to that of the log series of FIG. 3 (382 milliseconds).

FIG. 5 shows a simplified example of a first outlier log series, that results from a different log in request. Here, an error 500 is shown. This error indicates failure to verify the password. The existence of an error may offer strong evidence that the log message series of FIG. 5 is atypical, and hence is an outlier to be stored in its entirety.

FIG. 6 shows a simplified example of a second outlier log series, that results from another log in request. Here, a total time of 421 milliseconds is shown (by the reference number 600). This difference (of 10%) over the 382 ms total time for the non-outlier message series of FIG. 3, may reveal this log series' status as an outlier. Accordingly, it may be valuable to store the full series of FIG. 6 in its entirety for diagnostic purposes.

It is seen that among multiple login requests of FIGS. 3-6, their time costs can be different. However, the overall patterns of these log series are similar, e.g.:

request name is the requested interface name (for example, the name of an HTTP request is the URL);
 character count is the total count of characters in all log messages of one request;
 item count is the total count of log messages of one request;
 total cost is the total processing time of one request.

It is observed that for same kind of requests (here "/login"):
1. the request names are same;
2. the log message lengths and/or hash codes are similar;
3. the item counts are same (five); and
4. if there is not an exception, the total cost of the total processing time is similar.

Different systems may utilize a different log format and item count, but the logs may all have the above four features in common. Accordingly, embodiments implement a system of log sampling and storage, that features the following actions.

First, logs are iterated in order to obtain the log series for each request. Log series may be sampled from historical data present in the log system. Alternatively, log series may be predefined by code logic.

Next, the most frequently appearing patterns of log series message present in the history, are identified. Frequently appearing patterns can be identified by analyzing one or more of:
  request name;
  total processing time (a number or range);
  message length (number or a range);
  message hash code;
  item count;

A common sampled reference log series will be stored for a same pattern.

Then, current incoming requests are monitored. Those incoming request log series are compared with existing patterns already identified.

If a current request log series matches an existing pattern, that log series is not considered an outlier. Hence, that current log series does not need to be stored in its entirety within the system.

Instead, for incoming log message series deemed similar enough to the predetermined patterns, embodiments take the following actions:
  1) increase by one, the total count of the matched pattern,
  2) recalculate the average cost of this type of request,
  3) get sampling data of the log series,
  4) add a link to this log series to a shared sample log series.

Specifically, for each incoming new request, its log series is monitored. Then, a current log series is compared with the existing patterns.

This matching of an existing pattern may extract a pattern for current monitored log series. This extracting can parse the log series to identify its individual elements such as original request, number of distinct items, per-item cost, and others.

Then, properties of the extracted pattern of the monitored log series (the request name, total processing time, log character count, hash code, and item count) are compared with the existing known patterns.

This comparison may involve the generation of a similarity metric for the log series that is being monitored. If a similarity between a current request and existing identified patterns lies within a threshold, the current request log series is considered to be a non-outlier.

Consider again the non-outlier log in request and log series shown in FIG. 3. Here, the log series will not be stored. Rather, just a row of the sampling data will be logged, and a link of this row will be added to the existing log series patterns.

An example of a sampled row is given below.
{request:/login, cost:382, sourceLink:<anchor to the existing log series pattern>}

Also, statistics of this non-outlier request type will be updated. An example of a statistic data structure is given below.
  {total:1802, count:5, max:398, min:224, mid:376}

Here, "total" refers to the ongoing total number of occurrences of this particular pattern. And, "count" refers to the number of items present in the pattern.

The terms "max", "min", and "mid" refer to costs (in milliseconds) of the pattern. These are respectively a maximum observed total cost, a minimum observed total cost, and a middle observed total cost (which can be specified according to an average, a median, or other value).

Returning now to FIG. 1, while that figure depicts the log storage engine as being located outside of the database storing the previously identified patterns, this is not required. According to alternative embodiments, the powerful processing engine of an in-memory database (e.g., the SAP HANA in-memory database) that is used to store the patterns, could be leveraged in order to also perform one or more tasks as have been described herein (e.g., pattern extraction: similarity determination).

Figure 7:
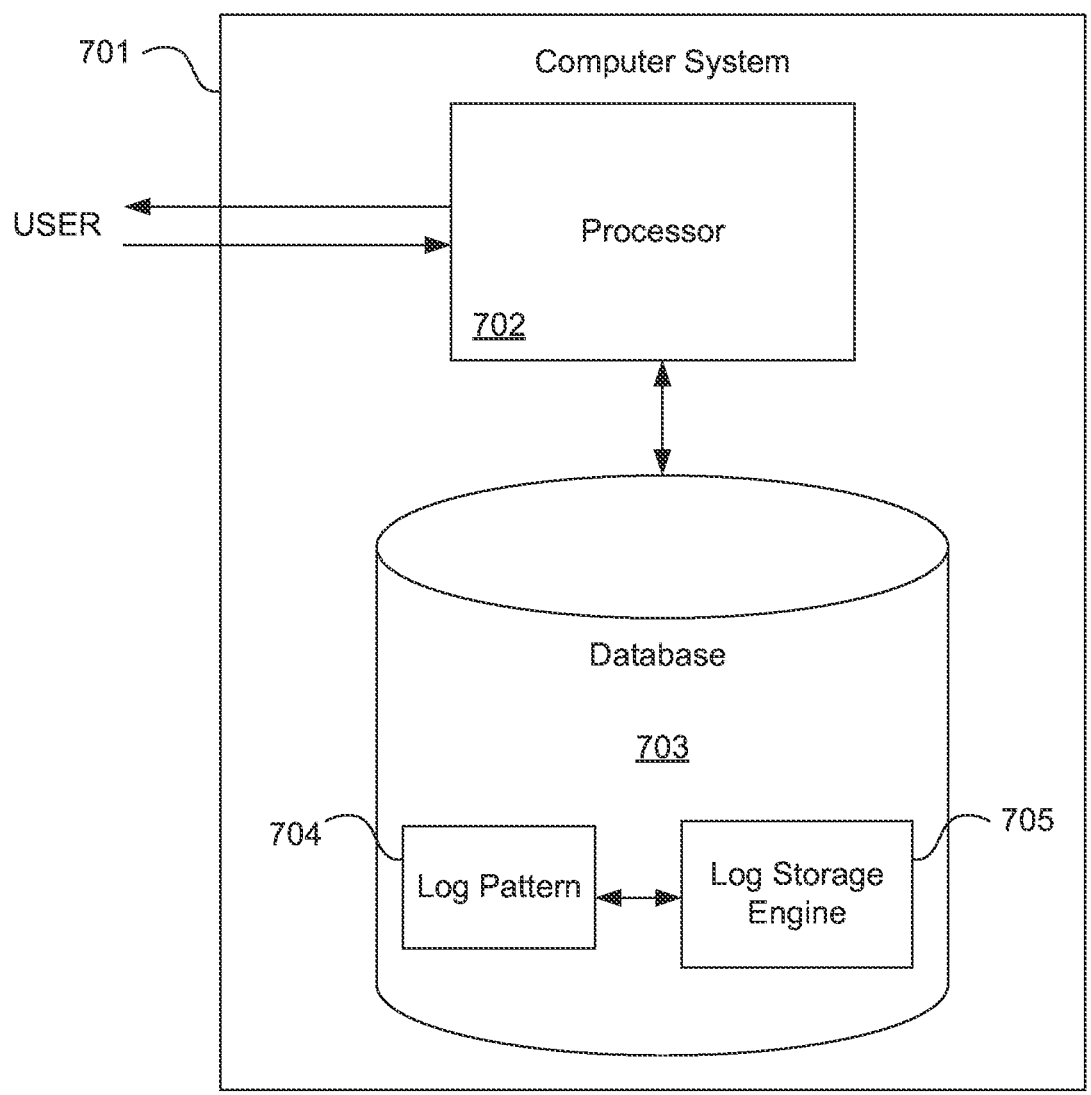
FIG. 7 illustrates hardware of a special purpose computing machine according to an embodiment that is configured to implement a log storage system.

FIG. 7 illustrates hardware of a special purpose computing machine configured to perform log sampling and storage according to an embodiment. In particular, computer system 701 comprises a processor 702 that is in electronic communication with a non-transitory computer-readable storage medium comprising a database 703. This computer-readable storage medium has stored thereon code 705 corresponding to a log storage engine. Code 704 corresponds to a log series pattern. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 8:
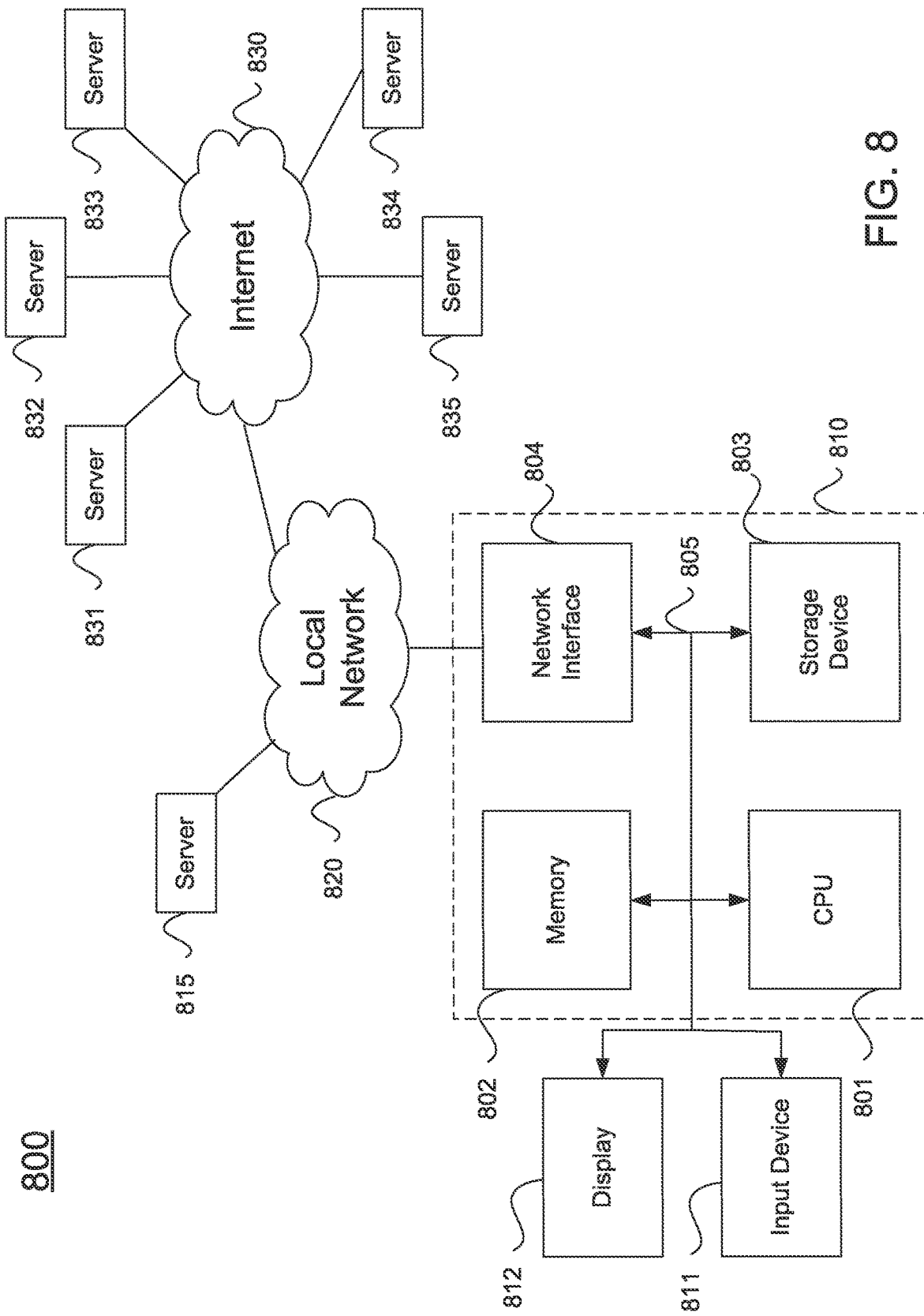
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a Light Emitting Diode (LED) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving a log series comprising a plurality of messages each having an associated processing time cost;
   extracting the log series into a first pattern, the first pattern comprising:
      a request name;
      a first log message;
      a second log message; and
      total processing time cost information corresponding to a total processing time cost of the plurality of messages;
   comparing the first pattern to a second pattern stored in a non-transitory computer readable storage medium to generate a similarity score;
   storing statistics in the non-transitory computer readable storage medium,
   wherein the statistics comprise an ongoing average of total processing time costs of log series previously matched with the second pattern;
   determining that the similarity score lies within a threshold value, the similarity score comprising at least a comparison of the total processing time cost information with the ongoing average of total processing time costs; and
   when the similarity score is outside the threshold value, storing the received log series, and
   when the similarity score is within the threshold value, storing a link to an existing sampled log series previously matching the second pattern, not storing the received log series, and updating the ongoing average of the total processing time costs.

2. A method as in claim 1 further comprising:
   sampling a history of log series data to identify a plurality of patterns including the second pattern; and
   storing the plurality of patterns in the non-transitory computer readable storage medium.

3. A method as in claim 1 wherein the cost information comprises a total time of execution.

4. A method as in claim 3 wherein the cost information further comprises:
   a time of execution of the first log message; and
   a time of execution of the second log message.

5. A method as in claim 1 wherein statistics further comprise a count for the second pattern.

6. A method as in claim 1 wherein the statistics further comprise updated cost information of the second pattern.

7. A method as in claim 1 wherein the comparing indicates that an exception is not present in the first log series.

8. A method as in claim 1 wherein:
   each message of the first pattern comprises a separate item; and
   the comparing indicates that an item count of the first pattern matches an item count of the second pattern.

9. A method as in claim 1 wherein:
   the non-transitory computer readable storage medium comprises an in-memory database; and
   the comparing is performed by an in-memory database engine of the in-memory database.

10. A non-transitory computer readable storage medium embodying a computer program for performing a method, said method comprising:
    receiving a log series comprising a plurality of messages each having an associated processing time cost;
    extracting the log series into a first pattern, the first pattern comprising:
       a request name;
       a first log message;
       a second log message; and
       total processing time cost information corresponding to a total processing time cost of the plurality of messages;
    comparing the first pattern to a second pattern stored in a non-transitory computer readable storage medium to generate a similarity score;
    storing statistics in the non-transitory computer readable storage medium,
    wherein the statistics comprise an ongoing average of total processing time costs of log series previously matched with the second pattern;
    determining that the similarity score lies within a threshold value, the similarity score comprising at least a comparison of the total processing time cost information with the ongoing average of total processing time costs; and
    when the similarity score is outside the threshold value, storing the received log series, and
    when the similarity score is within the threshold value, storing a link to an existing sampled log series previously matching the second pattern, not storing the received log series, and updating the ongoing average of the total processing time costs.

11. A non-transitory computer readable storage medium as in claim 10 wherein the cost information further comprises:
    a time of execution of the first log message; and
    a time of execution of the second log message.

12. A non-transitory computer readable storage medium as in claim 10 wherein the method further comprises:
    updating the statistics including a count for the second pattern.

13. A non-transitory computer readable storage medium as in claim 10 wherein the statistics further comprise updated cost information of the second pattern.

14. A non-transitory computer readable storage medium as in claim 10 wherein the comparing indicates that an exception is not present in the first log series.

15. A computer system comprising:
one or more processors;
a software program, executable on said computer system, the software program configured to cause an in-memory database engine of an in-memory source database to:
receive a log series comprising a plurality of messages each having an associated processing time cost;
extract the log series into a first pattern, the first pattern comprising:
a request name;
a first log message;
a second log message; and
total processing time cost information corresponding to a total processing time cost of the plurality of messages;
compare the first pattern to a second pattern stored in the in-memory database to generate a similarity score;
store statistics in the in-memory database, wherein the statistics comprise an ongoing average of total processing time costs of log series previously matched with the second pattern;
determine that the similarity score lies within a threshold value the similarity score comprising at least a comparison of the total processing time cost information with the ongoing average of total processing time costs; and
when the similarity score is outside the threshold value, store the received log series, and
when the similarity score is within the threshold value, store a link to an existing sampled log series previously matching the second pattern not storing the received log series, and update the ongoing average of the total processing time costs.

16. A computer system as in claim 15 wherein the cost information comprises:
a time of execution of the first log message;
a time of execution of the second log message; and
a total time of execution.

17. A computer system as in claim 15 wherein the in-memory database engine is further configured to:
update the statistics including a count for the second pattern and cost information of the second pattern.

18. A computer system as in claim 15 wherein the comparing indicates that an exception is not present in the first log series.

19. A computer system as in claim 15 wherein:
each message of the first pattern comprises a separate item; and
the comparing indicates that an item count of the first pattern matches an item count of the second pattern.

20. A computer system as in claim 15 wherein the in-memory database engine is further configured to:
sample a history of log series data to identify a plurality of patterns including the second pattern; and
store the plurality of patterns in the in-memory database.

* * * * *